(12) United States Patent
Xing et al.

(10) Patent No.: US 12,047,183 B2
(45) Date of Patent: Jul. 23, 2024

(54) METHODS FOR PROCESSING AND INDICATING HARQ MECHANISM, TERMINAL AND NETWORK SIDE DEVICE

(71) Applicant: DATANG MOBILE COMMUNICATIONS EQUIPMENT CO., LTD., Beijing (CN)

(72) Inventors: Yanping Xing, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 431 days.

(21) Appl. No.: 17/598,818

(22) PCT Filed: Mar. 27, 2020

(86) PCT No.: PCT/CN2020/081671
§ 371 (c)(1),
(2) Date: Sep. 27, 2021

(87) PCT Pub. No.: WO2020/200088
PCT Pub. Date: Oct. 8, 2020

(65) Prior Publication Data
US 2022/0200744 A1    Jun. 23, 2022

(30) Foreign Application Priority Data
Mar. 29, 2019  (CN) .......................... 201910248657.2

(51) Int. Cl.
*H04W 4/00*    (2018.01)
*H04L 1/1812*  (2023.01)
(Continued)

(52) U.S. Cl.
CPC .......... *H04L 1/1854* (2013.01); *H04L 1/1812* (2013.01); *H04B 7/155* (2013.01)

(58) Field of Classification Search
CPC ....... H04L 1/1854; H04L 1/1812; H04L 1/18; H04B 7/155
(Continued)

(56) References Cited

U.S. PATENT DOCUMENTS 9,369,239 B2 *   6/2016   Choi ...................... H04L 1/1825
11,539,493 B2 * 12/2022  Gao ....................... H04L 1/1812
(Continued)

FOREIGN PATENT DOCUMENTS

CN   102223219 A   10/2011
CN   102447550 A    5/2012
(Continued)

OTHER PUBLICATIONS

First Korean Office Action for the corresponding Korean Patent Application 10-2021-7032946, issued Aug. 14, 2023 by the Korean Patent Office, and its English translation provided by foreign associate.
(Continued)

*Primary Examiner* — Marceau Milord
(74) *Attorney, Agent, or Firm* — Ladas & Parry, LLP (57) ABSTRACT

Methods for processing and indicating an HARQ mechanism, a terminal and a network side device are provided. The method includes: receiving scheduling information, the scheduling information being used to schedule transmission of a data packet; and determining whether the data packet scheduled by the scheduling information adopts the HARQ mechanism in accordance with the scheduling information.

15 Claims, 2 Drawing Sheets

--- transmitting scheduling information, the scheduling information being used to schedule the transmission of a data packet and indicate whether the scheduled data packet adopts an HARQ mechanism     / 21

(51) Int. Cl.
*H04L 1/1829* (2023.01)
*H04B 7/155* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 11,564,212 | B2* | 1/2023 | Wang | H04W 72/21 |
| 11,606,804 | B2* | 3/2023 | Jiang | H04W 24/10 |
| 11,627,599 | B2* | 4/2023 | Han | H04L 1/1664 370/329 |
| 11,683,813 | B2* | 6/2023 | Choi | H04L 1/1854 370/329 |
| 11,729,788 | B2* | 8/2023 | Choi | H04L 1/1664 370/329 |
| 11,877,283 | B2* | 1/2024 | Lin | H04L 5/0094 |
| 2013/0242837 | A1 | 9/2013 | Yang et al. | |
| 2014/0321382 | A1* | 10/2014 | Guan | H04W 72/20 370/329 |
| 2015/0117337 | A1 | 4/2015 | Choi et al. | |
| 2018/0077643 | A1 | 3/2018 | Dinan | |
| 2019/0320431 | A1* | 10/2019 | Huang | H04L 1/1664 |
| 2020/0367265 | A1* | 11/2020 | Wang | H04L 1/1854 |
| 2020/0374867 | A1* | 11/2020 | Du | H04W 72/21 |
| 2021/0144702 | A1* | 5/2021 | Zhao | H04L 5/0044 |
| 2021/0266936 | A1* | 8/2021 | Gao | H04W 72/21 |
| 2022/0007404 | A1* | 1/2022 | Gou | H04L 1/1854 |

FOREIGN PATENT DOCUMENTS

| | | |
|---|---|---|
| CN | 105978671 A | 9/2016 |
| CN | 108633070 A | 10/2018 |

OTHER PUBLICATIONS

"Deactivating HARQ for Non Terrestrial Networks," 3GPP TSG RAN WG1 Meeting #92 bis, R1-1804857, Agenda Item: 7.3.2, Source: InterDigital Inc., Sanya, China, Apr. 16 -20, 2018, all pages.
"Discussion on HARQ for NTN," 3GPP TSG RAN WG 1 Meeting #96, R1-1903203, Agenda Item:7.2.14, Source: Huawei , HiSilicon, Athens, Greece, Feb. 25-Mar. 1, 2019, all pages.
First Office Action and search report for Chinese patent application No. 201910248657.2, mailed on May 28, 2021 with EN translation provided by Global Dossier.
Second Office Action and search report for Chinese patent application No. 201910248657.2, mailed on Dec. 6, 2021 with EN translation provided by Global Dossier.
International Search Report for PCT/CN2020/081671, mailed on Jun. 30, 2020, and its EN translation provided by WIPO.
Written Opinion for PCT/CN2020/081671, mailed on Jun. 30, 2020, and its EN translation provided by WIPO.
International Preliminary Report on Patentability for PCT/CN2020/081671, mailed on Sep. 28, 2021.
3GPP TSG-RAN WG2 Meeting #104 R2-1817757 Spokane, USA, Nov. 12-16, 2018 Source: Fraunhofer IIS, Fraunhofer HHI, Title: "NR-NTN: HARQ in Satellite Systems" .
3GPP TSG-RAN WG2 #104 Tdoc R2-1817764 Spokane, US, Nov. 12-16, 2018 Agenda Item: 11.6.3.1 Source: Ericsson, Title: "On HARQ for NTN".
3GPP TSG-RAN WG2 #105 Meeting R2-1900575 Athens, Greece, Feb. 25-Mar. 1, 2019 Agenda item: 11.6.3.1 Source: ZTE Corporation, Sanechips, Title: "Consideration on HARQ for NTN".
3GPP TSG RAN WG2 Meeting #105 R2-1901490 Athens, Feb. 25-Mar. 1, 2019 Agenda Item: 11.6.3.1 Source: Nomor Research GmbH, Title: "HARQ for NTN".
3GPP TSG RAN WGI Meeting #92 R1-1802631 Athens, Greece, Feb. 26-Mar. 2, 2018 Agenda Item: 7.3.2 Source: InterDigital Inc., Title: "Considerations on HARQ Management for Non-Terrestrial Networks".
3GPP TSG RAN WG1 Meeting #99 R1-1913327 Reno, Nevada, US, Nov. 18-22, 2019 Agenda Item: 7.2.5.4 Source: MediaTek Inc., Title: "Summary of 7.2.5.4 on more delay-tolerant re-transmission mechanisms in NR-NTN".
3GPP TSG-RAN WG2 Meeting #104 R2-1818247 Spokane, USA, Nov. 12-6, 2018 Agenda item: 11.6.3.1 Source: Huawei, HiSilicon Title: "Further discussion on MAC impacts in NTN".
Extended European Search Report for European Patent Application 20783527.3, issued on Apr. 20, 2022.
"Deactivating HARQ for Non-Terrestrial Networks," 3GPP TSG RAN WG1 Meeting #92bis, R1-1804857, Sanya, China, Apr. 16-20, 2018, Agenda Item: 7.3.2, Source: InterDigital Inc.
First Office Action for Indian Patent Application 202127046363, issued Apr. 27, 2022.

* cited by examiner

METHODS FOR PROCESSING AND INDICATING HARQ MECHANISM, TERMINAL AND NETWORK SIDE DEVICE

CROSS-REFERENCE TO RELATED APPLICATIONS

This application is the U.S. national phase of PCT Application No. PCT/CN2020/081671 filed on Mar. 27, 2020, which claims a priority of the Chinese patent application No. 201910248657.2 filed in China on Mar. 29, 2019, the disclosures of which are incorporated herein by reference in their entireties.

TECHNICAL FIELD

The present disclosure relates to the field of communications technology, in particular to a method for processing a Hybrid Automatic Repeat reQuest (HARQ) mechanism, a method for indicating an HARQ mechanism, a terminal and a network side device.

BACKGROUND

Due to an HARQ mechanism, which has been widely used in a mobile communications network, link performance is improved through receiver combining, so as to improve spectrum efficiency of a system. In addition, due to the existence of a plurality of parallel HARQ processes, data transmission is performed through the other HARQ processes within a Round-Trip Time (RTT) of one HARQ process, so as to improve a transmission rate.

For a ground cellular system, a cell has a relatively small radius, a transmission delay is not large, and the RTT principally depends on a duration of a physical channel as well as a processing time of a transmitter and a receiver. As a significant difference between a satellite communications system and the ground cellular system, there is a very large distance between a terminal and a network in the satellite communications system, so the transmission delay is very large and becomes a main factor that adversely influences the RTT. Hence, the quantity of HARQ processes, e.g., dozens of or hundreds of processes, in the satellite communications system is much larger than the quantity of HARQ processes in the ground cellular system. One issue caused by the large quantity of HARQ processes lies in that a size of a cache at the receiver increases linearly.

In order to solve the problem that the quantity of HARQ processes in the satellite communications system is too large, one scheme includes deactivating an HARQ. The deactivation of the HARQ refers to that the HARQ mechanism is not adopted at a physical layer, which includes not performing HARQ-Acknowledgement (ACK) feedback on a data packet at the receiver, not performing HARQ repetition on the data packet at the transmitter, and correspondingly, not performing HARQ combining at the receiver. The HARQ is deactivated semi-statically or dynamically. In a mode where the HARQ is deactivated semi-statically, the HARQ mechanism is not adopted by the terminal with respect to all the data packets within a certain time period. In a mode where the HARQ mechanism is deactivated dynamically, whether the HARQ mechanism is adopted is selected by the transmitter dynamically with respect to each data packet. As compared with the mode where the HARQ mechanism is deactivated semi-statically, the mode where the HARQ mechanism is deactivated dynamically is more flexible. However, how to deactivate the HARQ mechanism dynamically is still under study, and there is currently no definite scheme.

SUMMARY

An object of the present disclosure is to provide a method for processing an HARQ mechanism, a method for indicating an HARQ mechanism, a terminal and a network side device, so as to solve the problem in the related art where the mode where the HARQ mechanism is deactivated is less flexible.

In one aspect, the present disclosure provides in some embodiments a method for processing an HARQ mechanism for a terminal, including:
  receiving scheduling information, wherein the scheduling information is used to schedule transmission of a data packet; and
  determining whether the data packet scheduled by the scheduling information adopts the HARQ mechanism in accordance with the scheduling information.

In a possible embodiment of the present disclosure, the scheduling information comprises a first bit field for indicating that an HARQ is to be activated or deactivated,
  wherein the determining whether the data packet scheduled by the scheduling information adopts the HARQ mechanism in accordance with the scheduling information comprises:
  in the case that the first bit field indicates that the HARQ is to be activated, determining that the data packet scheduled by the scheduling information adopts the HARQ mechanism; and
  in the case that the first bit field indicates that the HARQ is to be deactivated, determining that the data packet scheduled by the scheduling information does not adopt the HARQ mechanism.

In a possible embodiment of the present disclosure, the scheduling information comprises a second bit field for indicating an HARQ process number,
  wherein the determining whether the data packet scheduled by the scheduling information adopts the HARQ mechanism in accordance with the scheduling information comprises:
  in the case that a value of the second bit field is a preset target value indicating that the HARQ is to be deactivated, determining that the data packet scheduled by the scheduling information does not adopt the HARQ mechanism;
  in the case that the value of the second bit field is not the target value, determining that the data packet scheduled by the scheduling information adopts the HARQ mechanism.

In a possible embodiment of the present disclosure, the method further includes:
  obtaining a scrambling value for scrambling the scheduling
  wherein in the case that the scrambling value is a preset value, when the value of the second bit field is the target value, the data packet scheduled by the scheduling information does not adopt the HARQ mechanism, and when the value of the second bit field is not the target value, the data packet scheduled by the scheduling information adopts the HARQ mechanism.

In a possible embodiment of the present disclosure, the determining whether the data packet scheduled by the scheduling information adopts the HARQ mechanism in accordance with the scheduling information comprises:

obtaining an HARQ process indicated by the scheduling information;

in the case that the HARQ process indicated by the scheduling information belongs to an HARQ process set for activating the HARQ, determining that the data packet scheduled by the scheduling information adopts the HARQ mechanism;

in the case that the HARQ process indicated by the scheduling information belongs to an HARQ process set for deactivating the HARQ, determining that the data packet scheduled by the scheduling information does not adopt the HARQ mechanism.

In a possible embodiment of the present disclosure, the method further includes:

obtaining any of the following information configured semi-statically:

an HARQ process number in the HARQ process set for activating the HARQ, and an HARQ process number in the HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the quantity of HARQ processes in the HARQ process set for deactivating the HARQ;

a maximum quantity of transmission times for the HARQ process in each HARQ process set.

In a possible embodiment of the present disclosure, the determining whether the data packet scheduled by the scheduling information adopts the HARQ mechanism in accordance with the scheduling information comprises:

determining whether the data packet scheduled by the scheduling information adopts the HARQ mechanism in accordance with a scrambling value for scrambling the scheduling information; or determining whether the data packet scheduled by the scheduling information adopts the HARQ mechanism in accordance with a search space where the scheduling information is located; or determining whether the data packet scheduled by the scheduling information adopts the HARQ mechanism in accordance with a format of the scheduling information; or determining whether the data packet scheduled by the scheduling information adopts the HARQ mechanism in accordance with a length of the scheduling information.

In a possible embodiment of the present disclosure, in the case that the data packet scheduled by the scheduling information does not adopt the HARQ mechanism, a receiver receiving the data packet does not perform HARQ feedback with respect to the data packet.

In another aspect, the present disclosure provides in some embodiments a method for indicating a Hybrid Automatic Repeat reQuest (HARQ) mechanism for a network side device, comprising:

transmitting scheduling information, wherein the scheduling information is used to schedule transmission of a data packet and indicate whether the scheduled data packet adopts the HARQ mechanism.

In a possible embodiment of the present disclosure, the scheduling information comprises a first bit field for indicating that an HARQ is to be activated or deactivated;

in the case that the first bit field indicates that the HARQ is to be activated, the data packet scheduled by the scheduling information adopts the HARQ mechanism;

in the case that the first bit field indicates that the HARQ is to be deactivated, the data packet scheduled by the scheduling information does not adopt the HARQ mechanism.

In a possible embodiment of the present disclosure, the scheduling information comprises a second bit field for indicating an HARQ process number;

in the case that a value of the second bit field is a preset target value indicating that the HARQ is to be deactivated, the data packet scheduled by the scheduling information does not adopt the HARQ mechanism;

in the case that the value of the second bit field is not the target value, the data packet scheduled by the scheduling information adopts the HARQ mechanism.

In a possible embodiment of the present disclosure, the method further includes semi-statically configuring any of the following information:

an HARQ process number in an HARQ process set for activating the HARQ, and an HARQ process number in a second HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set, wherein in the case that the HARQ process indicated by the scheduling information belongs to the HARQ process set for activating the HARQ, the data packet scheduled by the scheduling information adopts the HARQ mechanism;

in the case that the HARQ process indicated by the scheduling information belongs to the HARQ process set for deactivating the HARQ, the data packet scheduled by the scheduling information does not adopt the HARQ mechanism.

In a possible embodiment of the present disclosure, whether the data packet scheduled by the scheduling information adopts the HARQ mechanism is indicated through a scrambling value scrambling the scheduling information; or whether the data packet scheduled by the scheduling information adopts the HARQ mechanism is indicated through a search space where the scheduling information is located; or whether the data packet scheduled by the scheduling information adopts the HARQ mechanism is indicated through a format of the scheduling information; or whether the data packet scheduled by the scheduling information adopts the HARQ mechanism is indicated through a length of the scheduling information.

In a possible embodiment of the present disclosure, in the case that the data packet scheduled by the scheduling information does not adopt the HARQ mechanism, the method further includes:

configuring an information field associated with the HARQ in the scheduling information for other uses.

In a possible embodiment of the present disclosure, in the case that the data packet scheduled by the scheduling information does not adopt the HARQ mechanism, a receiver receiving the data packet does not perform HARQ feedback with respect to the data packet.

In yet another aspect, the present disclosure provides in some embodiments a terminal, including a transceiver, a memory, a processor, and a computer program stored in the memory and capable of being executed by the processor; the transceiver is configured to receive scheduling information, the scheduling information is used to schedule the transmission of a data packet;

the processor is configured to read the computer program in the memory to: determine whether the data packet scheduled by the scheduling information adopts a Hybrid Automatic Repeat reQuest (HARQ) mechanism in accordance with the scheduling information.

In a possible embodiment of the present disclosure, the scheduling information comprises a first bit field for indicating that an HARQ is to be activated or deactivated;

the processor is further configured to:

in the case that the first bit field indicates that the HARQ is to be activated, determine that the data packet scheduled by the scheduling information adopts the HARQ mechanism;

in the case that the first bit field indicates that the HARQ is to be deactivated, determine that the data packet scheduled by the scheduling information does not adopt the HARQ mechanism.

In a possible embodiment of the present disclosure, the scheduling information comprises a second bit field for indicating an HARQ process number;

the processor is further configured to:

in the case that a value of the second bit field is a preset target value indicating that the HARQ is to be deactivated, determine that the data packet scheduled by the scheduling information does not adopt the HARQ mechanism;

in the case that the value of the second bit field is not the target value, determine that the data packet scheduled by the scheduling information adopts the HARQ mechanism.

In a possible embodiment of the present disclosure, the processor is further configured to:

obtain a scrambling value for scrambling the scheduling information, wherein in the case that the scrambling value is a preset value, when the value of the second bit field is the target value, the data packet scheduled by the scheduling information does not adopt the HARQ mechanism, and when the value of the second bit field is not the target value, the data packet scheduled by the scheduling information adopts the HARQ mechanism.

In a possible embodiment of the present disclosure, the processor is further configured to:

obtain an HARQ process indicated by the scheduling information;

in the case that the HARQ process indicated by the scheduling information belongs to an HARQ process set for activating the HARQ, determine that the data packet scheduled by the scheduling information adopts the HARQ mechanism;

in the case that the HARQ process indicated by the scheduling information belongs to an HARQ process set for deactivating the HARQ, determine that the data packet scheduled by the scheduling information does not adopt the HARQ mechanism.

In a possible embodiment of the present disclosure, the transceiver is further configured to:

obtain any of the following information configured semi-statically:

an HARQ process number in the HARQ process set for activating the HARQ, and an HARQ process number in the HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set.

In a possible embodiment of the present disclosure, the processor is further configured to:

determine whether the data packet scheduled by the scheduling information adopts the HARQ mechanism in accordance with a scrambling value for scrambling the scheduling information; or determine whether the data packet scheduled by the scheduling information adopts the HARQ mechanism in accordance with a search space where the scheduling information is located; or determine whether the data packet scheduled by the scheduling information adopts the HARQ mechanism in accordance with a format of the scheduling information; or determine whether the data packet scheduled by the scheduling information adopts the HARQ mechanism in accordance with a length of the scheduling information.

In a possible embodiment of the present disclosure, in the case that the data packet scheduled by the scheduling information does not adopt the HARQ mechanism, a receiver receiving the data packet does not perform HARQ feedback with respect to the data packet.

In still yet another aspect, the present disclosure provides in some embodiments a device for processing a Hybrid Automatic Repeat reQuest (HARQ) mechanism for a terminal, comprising:

a reception module configured to receive scheduling information, wherein the scheduling information is used to schedule transmission of a data packet;

a determination module configured to determine whether the data packet scheduled by the scheduling information adopts the HARQ mechanism in accordance with the scheduling information.

In still yet another aspect, the present disclosure provides in some embodiments a network side device, including a transceiver, a memory, a processor, and a computer program stored in the memory and capable of being executed by the processor, wherein the transceiver is configured to:

transmit scheduling information, wherein the scheduling information is used to schedule transmission of a data packet and indicate whether the scheduled data packet adopts a Hybrid Automatic Repeat reQuest (HARQ) mechanism.

In a possible embodiment of the present disclosure, the scheduling information comprises a first bit field for indicating that an HARQ is to be activated or deactivated;

in the case that the first bit field indicates that the HARQ is to be activated, the data packet scheduled by the scheduling information adopts the HARQ mechanism;

in the case that the first bit field indicates that the HARQ is to be deactivated, the data packet scheduled by the scheduling information does not adopt the HARQ mechanism.

In a possible embodiment of the present disclosure, the scheduling information comprises a second bit field for indicating an HARQ process number;

in the case that a value of the second bit field is a preset target value indicating that the HARQ is to be deactivated, the data packet scheduled by the scheduling information does not adopt the HARQ mechanism;

in the case that the value of the second bit field is not the target value, the data packet scheduled by the scheduling information adopts the HARQ mechanism.

In a possible embodiment of the present disclosure, the processor is configured to semi-statically configure any of the following information:

an HARQ process number in an HARQ process set for activating the HARQ, and an HARQ process number in a second HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set, wherein in the case that the HARQ process indicated by the scheduling information belongs to the HARQ process set for activating the HARQ, the data packet scheduled by the scheduling information adopts the HARQ mechanism;

in the case that the HARQ process indicated by the scheduling information belongs to the HARQ process set for deactivating the HARQ, the data packet scheduled by the scheduling information does not adopt the HARQ mechanism.

In a possible embodiment of the present disclosure, whether the data packet scheduled by the scheduling information adopts the HARQ mechanism is indicated through a scrambling value scrambling the scheduling information; or whether the data packet scheduled by the scheduling information adopts the HARQ mechanism is indicated through a search space where the scheduling information is located; or whether the data packet scheduled by the scheduling information adopts the HARQ mechanism is indicated through a format of the scheduling information; or whether the data packet scheduled by the scheduling information adopts the HARQ mechanism is indicated through a length of the scheduling information.

In a possible embodiment of the present disclosure, the processor is further configured to:

in the case that the data packet scheduled by the scheduling information does not adopt the HARQ mechanism, configure an information field associated with the HARQ in the scheduling information for other uses.

In a possible embodiment of the present disclosure, in the case that the data packet scheduled by the scheduling information does not adopt the HARQ mechanism, a receiver receiving the data packet does not perform HARQ feedback with respect to the data packet.

In still yet another aspect, the present disclosure provides in some embodiments a device for indicating an HARQ mechanism for a network side device, including:

a transmission module configured to transmit scheduling information, wherein the scheduling information is used to schedule transmission of a data packet and indicate whether the scheduled data packet adopts the HARQ mechanism.

In still yet another aspect, the present disclosure provides in some embodiments a computer-readable storage medium storing therein a computer program. The computer program is executed by a processor so as to implement the steps of the above-mentioned method for processing an HARQ mechanism, or the steps of the above-mentioned method for indicating an HARQ mechanism.

The present disclosure at least has the following beneficial effect:

according to the methods for processing and indicating the HARQ mechanism, the terminal and the network side device in the embodiments of the present disclosure, whether an HARQ function is activated or deactivated for the data packet scheduled by the scheduling information is indicated dynamically through the scheduling information, so it is able for each data packet to dynamically select whether to adopt the HARQ mechanism, thereby to improve the transmission flexibility of the data packet.

DETAILED DESCRIPTION

In order to make the objects, the technical solutions and the advantages of the present disclosure more apparent, the present disclosure will be described hereinafter in conjunction with the drawings and embodiments.

Figure 1:
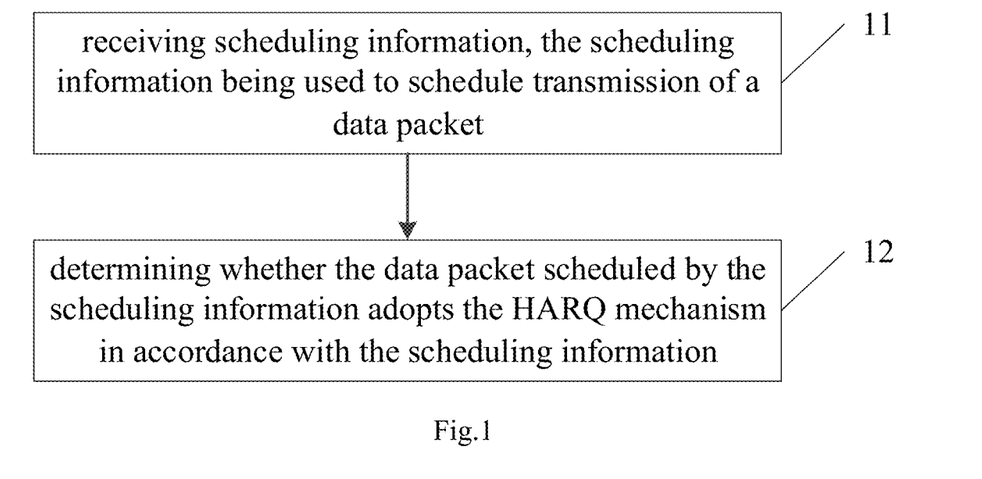
FIG. 1 is a flow chart of a method for processing an HARQ mechanism according to an embodiment of the present disclosure.

As shown in FIG. 1, the present disclosure provides in some embodiments a method for processing an HARQ mechanism for a terminal, which includes:

Step 11 of receiving scheduling information, the scheduling information being used to schedule transmission of a data packet;

Step 12 of determining whether the data packet scheduled by the scheduling information adopts the HARQ mechanism in accordance with the scheduling information.

In a possible embodiment of the present disclosure, the scheduling information may be Downlink Control Information (DCI) or Sidelink Control Information (SCI), which will not be particularly defined herein.

In the case that the data packet scheduled by the scheduling information does not adopt the HARQ mechanism, a receiver receiving the data packet does not perform HARQ feedback (HARQ-Acknowledgement (HARQ-ACK) or HARQ-Negative Acknowledgement (HARQ-NACK)), and a transmitter does not perform HARQ repetition with respect to the data packet.

In the case that the data packet scheduled by the scheduling information adopts the HARQ mechanism, the receiver performs the HARQ feedback (HARQ-ACK or HARQ-NACK) corresponding to the data packet, and the transmitter performs the HARQ repetition with respect to the data packet.

In a possible embodiment of the present disclosure, the scheduling information includes a first bit field for indicating that an HARQ is to be activated or deactivated;

correspondingly, Step 12 includes:

in the case that the first bit field indicates that the HARQ is to be activated, determining that the data packet scheduled by the scheduling information adopts the HARQ mechanism; and in the case that the first bit field indicates that the HARQ is to be deactivated, determining that the data packet scheduled by the scheduling information does not adopt the HARQ mechanism.

For example, the scheduling information includes one bit field (i.e., the first bit field) for indicating whether the HARQ is to be deactivated. For example, one bit in the DCI is used, and two values ('0' and '1') are used to represent that the HARQ is to be activated and that the HARQ is to be deactivated respectively. The receiver determines whether to activate the HARQ in accordance with the value of the bit field. When the DCI indicates that the HARQ is to be deactivated, the HARQ mechanism is not adopted, and the receiver does not feed back the HARQ-ACK corresponding to the data packet and does not cache the data packet. When the DCI indicates that the HARQ is to be activated, the HARQ mechanism is adopted, and the receiver feeds back the HARQ-ACK corresponding to the data packet. In addition, when decoding is performed unsuccessfully, the data packet is cached into a cache corresponding to an HARQ process indicated by the scheduling information for the subsequent repetition combining.

Further, preferably, when the DCI indicates that the HARQ is to be deactivated, an information field in the DCI associated with the HARQ, e.g., an HARQ process number, redundancy version information, a new data indicator and/or a feedback channel indicator, is redefined for the other uses.

In another possible embodiment of the present disclosure, the scheduling information includes a second bit field for indicating an HARQ process number;

correspondingly, Step 12 includes:

in the case that a value of the second bit field is a preset target value indicating that the HARQ is to be deactivated, determining that the data packet scheduled by the scheduling information does not adopt the HARQ mechanism; and in the case that the value of the second bit field is not the target value, determining that the data packet scheduled by the scheduling information adopts the HARQ mechanism.

In a possible embodiment of the present disclosure, the method further includes:

obtaining a scrambling value for scrambling the scheduling information;

in the case that the scrambling value is a preset value, when the value of the second bit field is the target value, determining that the data packet scheduled by the scheduling information does not adopt the HARQ mechanism, and when the value of the second bit field is not the target value, determining that the data packet scheduled by the scheduling information adopts the HARQ mechanism; and in the case that the scrambling value is not the preset value, determining that the data packet scheduled by the scheduling information adopts the HARQ mechanism.

To be specific, the determining whether the data packet scheduled by the scheduling information adopts the HARQ mechanism in accordance with the value of the second bit field includes:

in the case that the value of the second bit field is the preset target value indicating that the HARQ is to be deactivated, determining that the data packet scheduled by the scheduling information does not adopt the HARQ mechanism; and in the case that the value of the second bit field is not the target value, determining that the data packet scheduled by the scheduling information does not adopt the HARQ mechanism.

In other words, a specific value (i.e., the target value) of the second bit field in the scheduling information for indicating the HARQ process number is used to indicate that the HARQ is to be deactivated. When the HARQ process number indicated by the scheduling information is the specific value, the HARQ mechanism is not adopted, and the receiver does not feed back the HARQ-ACK corresponding to the data packet and does not cache the data packet. When the HARQ process number indicated by the scheduling information is not the specific value, the HARQ mechanism is adopted, and the receiver feeds back the HARQ-ACK corresponding to the data packet. In addition, when decoding is performed unsuccessfully, the data packet is cached into a cache corresponding to the HARQ process indicated by the scheduling information for subsequent repetition combining.

For example, it is agreed that the HARQ is to be deactivated when the bit field in the DCI for indicating the HARQ process number is in an all-zero state, i.e., the HARQ process number is 0, and at this time, one HARQ process is used to indicate the transmission where the HARQ mechanism is not adopted. Presumed that 500 HARQ processes are required to support continuous scheduling in accordance with an RTT and a Transmission Time Interval (TTI), the quantity of HARQ processes is configured at a network side, and whether the HARQ processes include a process not adopting the HARQ mechanism and corresponding to a value for indicating the deactivation of the HARQ is pre-agreed. When the configured HARQ processes include the process not adopting the HARQ mechanism and corresponding to the value for indicating the deactivation of the HARQ, the quantity of processes supporting the HARQ mechanism is the quantity of HARQ processes configured at the network side minus 1. Otherwise, the quantity of processes supporting the HARQ mechanism is equal to the quantity of HARQ processes configured at the network side.

When the HARQ processes configured at the network side include the process not adopting the HARQ mechanism and corresponding to the value for indicating the deactivation of the HARQ, and the quantity of HARQ processes configured at the network side is 501, 9 bits in the DCI are used to indicate the HARQ process. At the network side, the HARQ mechanism is adopted for all the HARQ processes, or the HARQ mechanism is not adopted for a part of the HARQ processes. At this time, the second bit field for indicating the HARQ process number is set as all zeroes.

When the HARQ processes configured at the network side include the process not adopting the HARQ mechanism and corresponding to the value for indicating the deactivation of the HARQ, and the quantity of HARQ processes configured at the network side is 256, 8 bits in the DCI are used to indicate the HARQ process. Within one RTT, at most 255 HARQ processes support the HARQ mechanism, and for the other HARQ processes, the bit field for indicating the HARQ process numbers is set as all zeroes, so as to indicate the transmission where the HARQ mechanism is deactivated.

When the HARQ processes configured at the network side do not include the process not adopting the HARQ mechanism and corresponding to the value for indicating the deactivation of the HARQ, the quantity of HARQ processes indicated by the DCI is at least equal to the quantity of HARQ processes configured at the network side plus 1. When the quantity of HARQ processes configured at the network side is 255, 8 bits in the DCI are used to indicate the HARQ process. Within one RTT, at most 255 HARQ processes support the HARQ mechanism, and for the other HARQ processes, the bit field for indicating the HARQ process numbers is set as all zeroes, so as to indicate the transmission where the HARQ mechanism is deactivated.

In a possible embodiment of the present disclosure, when the HARQ process is the target value, i.e., when the HARQ mechanism is not adopted, the information field in the DCI associated with the HARQ, e.g., the redundancy version information, the new data indicator and/or the feedback channel indicator, is redefined for the other uses.

Further, considering that the HARQ process with a process number of 0 is probably used for semi-persistent scheduled or configured transmission, prior to determining whether the HARQ process numbers indicated in the scheduling information are all zeroes, an RNTI of the scrambled scheduling information is determined. In the case that the RNTI is a specific value, whether the HARQ is to be deactivated is determined in accordance with whether the HARQ process numbers indicated in the scheduling information are all zeroes; otherwise, the HARQ is to be activated by default. For example, when the RNTI is a Cell-RNTI (C-RNTI), whether the HARQ is to be deactivated is determined in accordance with whether the HARQ process numbers indicated in the scheduling information are all zeroes, and when the RNTI is a Configured Scheduling-RNTI (CS-RNTI), the HARQ is to be activated by default.

Alternatively, in order to prevent the occurrence of a conflict in the process numbers for the semi-persistent scheduled or configured transmission, the HARQ is indicated to be deactivated when the bit field for indicating the HARQ process number is in an all-one state. At the network side, the quantity of HARQ processes for the semi-persistent scheduled or configured transmission is set to be smaller than the total quantity of HARQ processes, so as to prevent the HARQ process numbers from being all ones.

In another possible embodiment of the present disclosure, Step 12 includes:
obtaining an HARQ process indicated by the scheduling information, wherein the scheduling information includes a bit field indicating a HARQ process number;
in the case that the HARQ process indicated by the scheduling information belongs to an HARQ process set for activating the HARQ, determining that the data packet scheduled by the scheduling information adopts the HARQ mechanism;
in the case that the HARQ process indicated by the scheduling information belongs to an HARQ process set for deactivating the HARQ, determining that the data packet scheduled by the scheduling information does not adopt the HARQ mechanism.

Correspondingly, the method further includes obtaining any of the following information configured semi-statically:
an HARQ process number in the HARQ process set for activating the HARQ and an HARQ process number in the HARQ process set for deactivating the HARQ;
an HARQ process number in the HARQ process set for activating the HARQ;
an HARQ process number in the HARQ process set for deactivating the HARQ;
the quantity of HARQ processes in the HARQ process set for activating the HARQ;
the quantity of HARQ processes in the HARQ process set for deactivating the HARQ; and
a maximum quantity of transmission times for the HARQ process in each HARQ process set.

At the network side, the HARQ processes are divided into two sets. An HARQ function for the HARQ processes in one set is deactivated, and the HARQ function for the HARQ processes in the other set is activated. In a possible embodiment of the present disclosure, the HARQ process sets are divided semi-statically. The receiver determines whether to activate or deactivate the HARQ function in accordance with the set to which the HARQ process number belongs.

To be specific, the network side divides the sets in accordance with the HARQ process numbers or the quantity of HARQ processes, e.g., notifies the HARQ processes in each set, or notifies all HARQ processes in one set (the other HARQ processes belong to the other set), or notifies the quantity of HARQ processes in one set and determines the HARQ processes corresponding to the set using a predefined rule (the other HARQ processes belong to the other set), or notifies the quantity of HARQ processes in each set.

For example, when the network side device determines that 500 HARQ processes are required to support continuous scheduling in accordance with the RTT and the TTI, the network side notifies the HARQ process set for activating the HARQ and the HARQ process set for deactivating the HARQ. Alternatively, the network side notifies the HARQ process set for activating the HARQ, and the other HARQ processes belong to the HARQ process set for deactivating the HARQ, and vice versa. Alternatively, the network side notifies the quantity of HARQ processes for activating the HARQ, e.g., M. At this time, the HARQ processes 0 to M−1 are HARQ processes for activating the HARQ function, and the other HARQ processes are processes for deactivating the HARQ function, and vice versa. Alternatively, the network side notifies the quantity of HARQ processes for activating the HARQ, e.g., M, and at this time, the HARQ processes 0 to M−1 are HARQ processes for activating the HARQ. The network side notifies the quantity of HARQ processes for deactivating the HARQ, e.g., N, and at this time, the HARQ processes 499-N to 499 are HARQ processes for deactivating the HARQ function, and vice versa.

The network side further divides the sets through configuring the maximum quantity of transmission times for the HARQ processes. For example, the maximum quantity of transmission times is configured for each HARQ process or a group of HARQ processes. When the maximum quantity of transmission times configured for the HARQ process is 1, it means that the HARQ process belongs to the set for deactivating the HARQ function. To be specific, when the maximum quantity of transmission times for the HARQ processes 0 to N is configured by the network side as 1 and the maximum quantity of transmission times for the other HARQ processes is 8, the HARQ processes 0 to N belong to the HARQ process set for deactivating the HARQ, and the other HARQ processes belong to the HARQ process set for activating the HARQ.

In a possible embodiment of the present disclosure, the receiver divides an HARQ cache in accordance with the quantity of HARQ processes for activating the HARQ.

In a possible embodiment of the present disclosure, for the HARQ process for activating the HARQ, the information field in the scheduling information associated with the HARQ, e.g., the redundancy version information, the new data indicator and/or the feedback channel indicator, is redefined for the other uses.

In yet another possible embodiment of the present disclosure, Step 12 includes:
  determining whether the data packet scheduled by the scheduling information adopts the HARQ mechanism in accordance with a scrambling value for scrambling the scheduling information. For example, two different RNTIs are used, with one corresponding to a situation where the HARQ mechanism is to be activated and the other corresponding to a situation where the HARQ mechanism is to be deactivated. Whether the HARQ mechanism is to be activated is implicitly indicated through the RNTI scrambling the DCI.

Alternatively, Step 12 includes:
  determining whether the data packet scheduled by the scheduling information adopts the HARQ mechanism in accordance with a search space where the scheduling information is located. For example, for each search space, it is configured or agreed that the DCI corresponds to a situation where the HARQ mechanism is to be activated or deactivated. Whether the HARQ mechanism is to be activated is implicitly indicated through the search space where the DCI is located.

Alternatively, Step 12 includes:
  determining whether the data packet scheduled by the scheduling information adopts the HARQ mechanism in accordance with a format of the scheduling information. For example, different DCI formats are defined for the situation where the HARQ mechanism is to be activated and the situation where the HARQ mechanism is to be deactivated, and a User Equipment (UE) performs blind detection on the different DCI formats. Whether the HARQ mechanism is to be activated is implicitly indicated through the DCI format.

Alternatively, Step 12 includes:
  determining whether the data packet scheduled by the scheduling information adopts the HARQ mechanism in accordance with a length of the scheduling information. For example, for the scheduling where the HARQ function is to be activated, the length of the DCI is designed as S1, and for the scheduling where the HARQ function is to be deactivated, the length of the DCI is designed as S2. An information field associated with the HARQ, e.g., an HARQ process indicator, a new data indicator, a redundancy version indicator and a feedback channel indicator, may be deleted. Hence, typically, S1>S2. The terminal performs blind detection in accordance with the two DCI lengths. When the DCI has been decoded correctly, the terminal determines whether the HARQ function is activated for a current data packet in accordance with the DCI length.

In brief, whether the HARQ is to be deactivated is implicitly indicated through the RNTI for scrambling the scheduling information, the search space where the scheduling information is located, the format of the scheduling information or the length of the scheduling information.

In a word, whether the HARQ function is activated or deactivated for the data packet scheduled by the scheduling information is indicated dynamically through the scheduling information. As a result, it is able for each data packet to dynamically select whether to adopt the HARQ mechanism, thereby to improve the transmission flexibility of the data packet.

Figure 2:
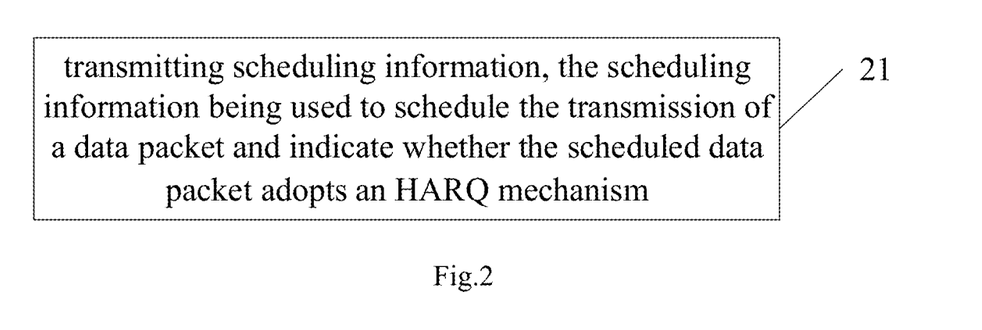
FIG. 2 is a flow chart of a method for indicating an HARQ mechanism according to an embodiment of the present disclosure.

As shown in FIG. 2, the present disclosure further provides in some embodiments a method for indicating an HARQ mechanism for a network side device, which includes:
  Step 21 of transmitting scheduling information, the scheduling information being used to schedule the transmission of a data packet and indicate whether the scheduled data packet adopts an HARQ mechanism.

In a possible embodiment of the present disclosure, the scheduling information may be DCI or SCI, which will not be particularly defined herein.

In the case that the data packet scheduled by the scheduling information does not adopt the HARQ mechanism, a receiver receiving the data packet does not perform HARQ feedback (HARQ-ACK or HARQ-NACK) on the data packet, and a transmitter does not perform HARQ repetition with respect to the data packet.

In the case that the data packet scheduled by the scheduling information adopts the HARQ mechanism, the receiver performs the HARQ feedback (HARQ-ACK or HARQ-NACK) corresponding to the data packet, and the transmitter performs the HARQ repetition with respect to the data packet.

In a possible embodiment of the present disclosure, the scheduling information includes a first bit field for indicating that an HARQ is to be activated or deactivated;
  in the case that the first bit field indicates that the HARQ is to be activated, the data packet scheduled by the scheduling information adopts the HARQ mechanism;
  in the case that the first bit field indicates that the HARQ is to be deactivated, the data packet scheduled by the scheduling information does not adopt the HARQ mechanism.

For example, the scheduling information includes one bit field (i.e., the first bit field) for indicating whether the HARQ is to be deactivated. For example, one bit in the DCI is used, and two values ('0' and '1') are used to represent that the HARQ is to be activated and that the HARQ is to be deactivated respectively. The receiver determines whether to activate the HARQ in accordance with the value of the bit field. When the DCI indicates that the HARQ is to be deactivated, the HARQ mechanism is not adopted, and the receiver does not feed back the HARQ-ACK corresponding to the data packet and does not cache the data packet. When the DCI indicates that the HARQ is to be activated, the HARQ mechanism is adopted, and the receiver feeds back the HARQ-ACK corresponding to the data packet. In addition, when decoding is performed unsuccessfully, the data packet is cached into a cache corresponding to an HARQ process indicated by the scheduling information for the subsequent repetition combining.

Further, when the DCI indicates that the HARQ is to be deactivated, an information field in the DCI associated with the HARQ, e.g., an HARQ process number, redundancy version information, a new data indicator and/or a feedback channel indicator, may be redefined for the other uses.

In another possible embodiment of the present disclosure, the scheduling information includes a second bit field for indicating an HARQ process number;

in the case that a value of the second bit field is a preset target value indicating that the HARQ is to be deactivated, the data packet scheduled by the scheduling information does not adopt the HARQ mechanism; and in the case that the value of the second bit field is not the target value, the data packet scheduled by the scheduling information adopts the HARQ mechanism.

In other words, a specific value (i.e., the target value) of the second bit field in the scheduling information for indicating the HARQ process number is used to indicate that the HARQ is to be deactivated. When the HARQ process number indicated by the scheduling information is the specific value, the HARQ mechanism is not adopted, and the receiver does not feed back the HARQ-ACK corresponding to the data packet and does not cache the data packet. When the HARQ process number indicated by the scheduling information is not the specific value, the HARQ mechanism is adopted, and the receiver feeds back the HARQ-ACK corresponding to the data packet. In addition, when decoding is performed unsuccessfully, the data packet is cached into a cache corresponding to the HARQ process indicated by the scheduling information for subsequent repetition combining.

Further, considering that the HARQ process with a process number of 0 is probably used for semi-persistent scheduled or configured transmission, prior to determining whether the HARQ process numbers indicated in the scheduling information are all zeroes, an RNTI of the scrambled scheduling information is determined. In the case that the RNTI is a specific value, whether the HARQ is to be deactivated is determined in accordance with whether the HARQ process numbers indicated in the scheduling information are all zeroes; otherwise, the HARQ is to be activated by default. For example, when the RNTI is a C-RNTI, whether the HARQ is to be deactivated is determined in accordance with whether the HARQ process numbers indicated in the scheduling information are all zeroes, and when the RNTI is a CS-RNTI, the HARQ is to be activated by default.

Alternatively, in order to prevent the occurrence of a conflict in the process numbers for the semi-persistent scheduled or configured transmission, the HARQ is indicated to be deactivated when the bit field for indicating the HARQ process number is in an all-one state. At the network side, the quantity of HARQ processes for the semi-persistent scheduled or configured transmission is set to be smaller than the total quantity of HARQ processes, so as to prevent the HARQ process numbers from being all ones.

In a possible embodiment of the present disclosure, when the HARQ process is the target value, i.e., the HARQ mechanism is not adopted, the information field in the DCI associated with the HARQ, e.g., the redundancy version information, the new data indicator and/or the feedback channel indicator, may be redefined for the other uses.

In a possible embodiment of the present disclosure, the method further includes semi-statically configuring any of the following information:

an HARQ process number in an HARQ process set for activating the HARQ and an HARQ process number in a second HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set;

in the case that the HARQ process indicated by the scheduling information belongs to the HARQ process set for activating the HARQ, the data packet scheduled by the scheduling information adopts the HARQ mechanism;

in the case that the HARQ process indicated by the scheduling information belongs to the HARQ process set for deactivating the HARQ, the data packet scheduled by the scheduling information does not adopt the HARQ mechanism.

At the network side, the HARQ processes are divided into two sets. An HARQ function for the HARQ processes in one set is deactivated, and the HARQ function for the HARQ processes in the other set is activated. In a possible embodiment of the present disclosure, the HARQ process sets are divided semi-statically. The receiver determines whether to activate or deactivate the HARQ function in accordance with the set to which the HARQ process number belongs.

To be specific, the network side divides the sets in accordance with the HARQ process numbers or the quantity of HARQ processes, e.g., notifies the HARQ processes in each set, or notifies all HARQ processes in one set (the other HARQ processes belong to the other set), or notifies the quantity of HARQ processes in one set and determines the HARQ processes corresponding to the set using a predefined rule (the other HARQ processes belong to the other set), or notifies the quantity of HARQ processes in each set.

For example, when the network side device determines that 500 HARQ processes are required to support continuous scheduling in accordance with the RTT and the TTI, the network side notifies the HARQ process set for activating the HARQ and the HARQ process set for deactivating the HARQ. Alternatively, the network side notifies the HARQ process set for activating the HARQ, and the other HARQ processes belong to the HARQ function for deactivating the HARQ, and vice versa. Alternatively, the network side notifies the quantity of HARQ processes for activating the HARQ, e.g., M. At this time, the HARQ processes 0 to M−1 are HARQ processes for activating the HARQ function, and the other HARQ processes are processes for deactivating the HARQ function, and vice versa. Alternatively, the network side notifies the quantity of HARQ processes for activating the HARQ, e.g., M, and at this time, the HARQ processes 0 to M−1 are HARQ processes for activating the HARQ function. The network side notifies the quantity of HARQ processes for deactivating the HARQ, e.g., N, and at this time, the HARQ processes 499-N to 499 are HARQ processes for deactivating the HARQ function, and vice versa.

The network side further divides the sets through configuring the maximum quantity of transmission times for the HARQ processes. For example, the maximum quantity of transmission times is configured for each HARQ process or a group of HARQ processes. When the maximum quantity of transmission times is 1, it means that the HARQ process belongs to the set for deactivating the HARQ function. To be specific, when the maximum quantity of transmission times for the HARQ processes 0 to N is configured by the network side as 1 and the maximum quantity of transmission times for the other HARQ processes is 8, the HARQ processes 0 to N belong to the HARQ process set for deactivating the HARQ, and the other HARQ processes belong to the HARQ process set for activating the HARQ.

In a possible embodiment of the present disclosure, the receiver divides an HARQ cache in accordance with the quantity of HARQ processes for activating the HARQ.

In a possible embodiment of the present disclosure, for the HARQ process for activating the HARQ, the information field in the scheduling information associated with the HARQ, e.g., the redundancy version information, the new data indicator and/or the feedback channel indicator, may be redefined for the other uses.

In a possible embodiment of the present disclosure, whether the data packet scheduled by the scheduling information adopts the HARQ mechanism is indicated through a scrambling value scrambling the scheduling information. For example, two different RNTIs are used, with one corresponding to a situation where the HARQ mechanism is to be activated and the other corresponding to a situation where the HARQ mechanism is to be deactivated. Whether the HARQ mechanism is to be activated is implicitly indicated through the RNTI scrambling the DCI.

Alternatively, whether the data packet scheduled by the scheduling information adopts the HARQ mechanism is indicated through a search space where the scheduling information is located. For example, for each search space, it is configured or agreed that the DCI corresponds to a situation where the HARQ mechanism is to be activated or deactivated. Whether the HARQ mechanism is to be activated is implicitly indicated through the search space where the DCI is located.

Alternatively, whether the data packet scheduled by the scheduling information adopts the HARQ mechanism is indicated through a format of the scheduling information. For example, different DCI formats are defined for the situation where the HARQ mechanism is to be activated and the situation where the HARQ mechanism is to be deactivated, and a UE performs blind detection on the different DCI formats. Whether the HARQ mechanism is to be activated is implicitly indicated through the DCI format.

Alternatively, whether the data packet scheduled by the scheduling information adopts the HARQ mechanism is indicated through a length of the scheduling information. For example, for the scheduling where the HARQ function is to be activated, the length of the DCI is designed as S1, and for the scheduling where the HARQ function is to be deactivated, the length of the DCI is designed as S2. An information field associated with the HARQ, e.g., an HARQ process indicator, a new data indicator, a redundancy version indicator and a feedback channel indicator, may be deleted. Hence, typically, S1>S2. The terminal performs blind detection in accordance with the two DCI lengths. When the DCI has been decoded correctly, the terminal determines whether the HARQ function is activated for a current data packet in accordance with the DCI length.

In a possible embodiment of the present disclosure, in the case that the data packet scheduled by the scheduling information does not adopt the HARQ mechanism, the method further includes:

configuring an information field associated with the HARQ in the scheduling information for other uses.

In a word, whether the HARQ function is activated or deactivated for the data packet scheduled by the scheduling information is indicated dynamically through the scheduling information. As a result, it is able for each data packet to dynamically select whether to adopt the HARQ mechanism, thereby to improve the transmission flexibility of the data packet.

Figure 3:
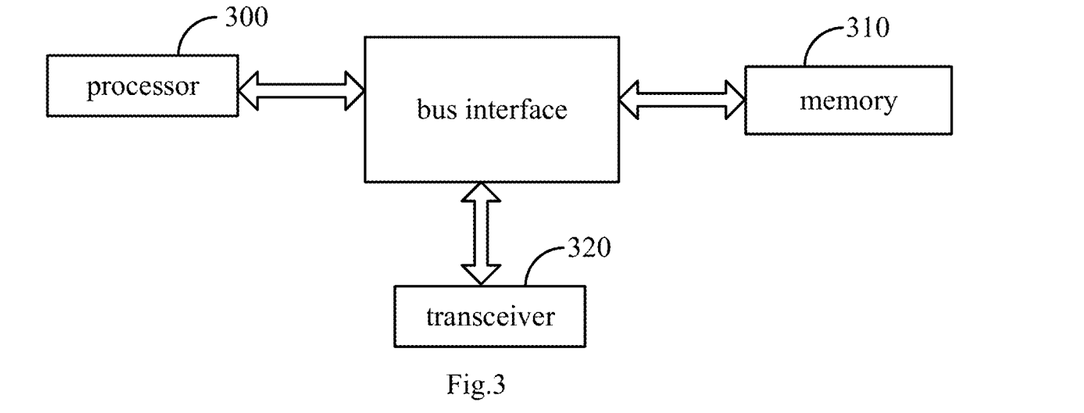
FIG. 3 is a schematic view showing a terminal and a network side device according to an embodiment of the present disclosure.

As shown in FIG. 3, the present disclosure further provides in some embodiments a terminal, which includes a transceiver 320, a memory 310, a processor 300, and a computer program stored in the memory 310 and executed by the processor 300;

the transceiver 320 is configured to receive scheduling information, the scheduling information is used to schedule the transmission of a data packet;

the processor 300 is configured to read the computer program in the memory so as to determine whether the data packet scheduled by the scheduling information adopts the HARQ mechanism in accordance with the scheduling information.

In a possible embodiment of the present disclosure, the scheduling information includes a first bit field for indicating that an HARQ is to be activated or deactivated;

the processor 300 is further configured to:

in the case that the first bit field indicates that the HARQ is to be activated, determine that the data packet scheduled by the scheduling information adopts the HARQ mechanism; and in the case that the first bit field indicates that the HARQ is to be deactivated, determine that the data packet scheduled by the scheduling information does not adopt the HARQ mechanism.

In a possible embodiment of the present disclosure, the scheduling information includes a second bit field for indicating an HARQ process number;

the processor 300 is further configured to:

in the case that a value of the second bit field is a preset target value indicating that the HARQ is to be deactivated, determine that the data packet scheduled by the scheduling information does not adopt the HARQ mechanism; and in the case that the value of the second bit field is not the target value, determine that the data packet scheduled by the scheduling information adopts the HARQ mechanism.

In a possible embodiment of the present disclosure, the processor 300 is further configured to:

obtain a scrambling value for scrambling the scheduling information;

in the case that the scrambling value is a preset value, when the value of the second bit field is the target value, the data packet scheduled by the scheduling information does not adopt the HARQ mechanism, and when the value of the second bit field is not the target value, the data packet scheduled by the scheduling information adopts the HARQ mechanism.

In a possible embodiment of the present disclosure, the processor 300 is further configured to:

obtain an HARQ process indicated by the scheduling information;

in the case that the HARQ process indicated by the scheduling information belongs to an HARQ process set for activating the HARQ, determine that the data packet scheduled by the scheduling information adopts the HARQ mechanism; and in the case that the HARQ process indicated by the scheduling information belongs to an HARQ process set for deactivating the HARQ, determine that the data packet scheduled by the scheduling information does not adopt the HARQ mechanism.

In a possible embodiment of the present disclosure, the transceiver 320 is further configured to:

obtain any of the following information configured semi-statically:

an HARQ process number in the HARQ process set for activating the HARQ and an HARQ process number in the HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set.

In a possible embodiment of the present disclosure, the processor 300 is further configured to:

determine whether the data packet scheduled by the scheduling information adopts the HARQ mechanism in accordance with a scrambling value for scrambling the scheduling information; or determine whether the data packet scheduled by the scheduling information adopts the HARQ mechanism in accordance with a search space where the scheduling information is located; or determine whether the data packet scheduled by the scheduling information adopts the HARQ mechanism in accordance with a format of the scheduling information; or determine whether the data packet scheduled by the scheduling information adopts the HARQ mechanism in accordance with a length of the scheduling information.

In a possible embodiment of the present disclosure, in the case that the data packet scheduled by the scheduling information does not adopt the HARQ mechanism, a receiver receiving the data packet does not perform HARQ feedback with respect to the data packet.

In a word, whether the HARQ function is activated or deactivated for the data packet scheduled by the scheduling information is indicated dynamically through the scheduling information. As a result, it is able for each data packet to dynamically select whether to adopt the HARQ mechanism, thereby to improve the transmission flexibility of the data packet.

It should be appreciated that, the terminal in the embodiments of the present disclosure is a terminal capable of executing the above-mentioned method for processing the HARQ mechanism, so all the embodiments involving the method are applicable to the terminal with a same or similar beneficial effect.

Figure 4:
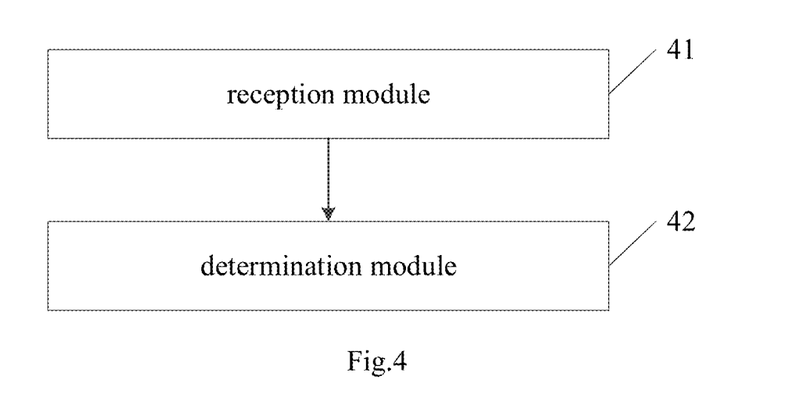
FIG. 4 is a schematic view showing a device for processing an HARQ mechanism according to an embodiment of the present disclosure.

As shown in FIG. 4, the present disclosure further provides in some embodiments a device for processing an HARQ mechanism for a terminal, which includes:

a reception module 41 configured to receive scheduling information, the scheduling information being used to schedule the transmission of a data packet; and a determination module 42 configured to determine whether the data packet scheduled by the scheduling information adopts the HARQ mechanism in accordance with the scheduling information.

In a possible embodiment of the present disclosure, the scheduling information includes a first bit field for indicating that an HARQ is to be activated or deactivated;

the determination module includes:

a first determination sub-module configured to: in the case that the first bit field indicates that the HARQ is to be activated, determine that the data packet scheduled by the scheduling information adopts the HARQ mechanism; or in the case that the first bit field indicates that the HARQ is to be deactivated, determine that the data packet scheduled by the scheduling information does not adopt the HARQ mechanism.

In a possible embodiment of the present disclosure, the scheduling information includes a second bit field for indicating an HARQ process number;

the determination module includes:

a second determination sub-module configured to: in the case that a value of the second bit field is a preset target value indicating that the HARQ is to be deactivated, determine that the data packet scheduled by the scheduling information does not adopt the HARQ mechanism; or in the case that the value of the second bit field is not the target value, determine that the data packet scheduled by the scheduling information adopts the HARQ mechanism.

In a possible embodiment of the present disclosure, the device further includes:

a first obtaining sub-module configured to obtain a scrambling value for scrambling the scheduling information;

in the case that the scrambling value is a preset value, when the value of the second bit field is the target value, the data packet scheduled by the scheduling information does not adopt the HARQ mechanism, and when the value of the second bit field is not the target value, the data packet scheduled by the scheduling information adopts the HARQ mechanism.

In a possible embodiment of the present disclosure, the determination module includes:

a second obtaining sub-module configured to obtain an HARQ process indicated by the scheduling information; and a fourth determination sub-module configured to, in the case that the HARQ process indicated by the scheduling information belongs to an HARQ process set for activating the HARQ, determine that the data packet scheduled by the scheduling information adopts the HARQ mechanism, or in the case that the HARQ process indicated by the scheduling information belongs to an HARQ process set for deactivating the HARQ, determine that the data packet scheduled by the scheduling information does not adopt the HARQ mechanism.

In a possible embodiment of the present disclosure, the device further includes:

an information obtaining module configured to obtain any of the following information configured semi-statically:

an HARQ process number in the HARQ process set for activating the HARQ and an HARQ process number in the HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set.

In a possible embodiment of the present disclosure, the determination module includes:

a fifth determination sub-module configured to: determine whether the data packet scheduled by the scheduling information adopts the HARQ mechanism in accordance with a scrambling value for scrambling the scheduling information; or determine whether the data packet scheduled by the scheduling information adopts the HARQ mechanism in accordance with a search space where the scheduling information is located; or determine whether the data packet scheduled by the scheduling information adopts the HARQ mechanism in accordance with a format of the scheduling information; or determine whether the data packet scheduled by the scheduling information adopts the HARQ mechanism in accordance with a length of the scheduling information.

In a possible embodiment of the present disclosure, in the case that the data packet scheduled by the scheduling information does not adopt the HARQ mechanism, a receiver receiving the data packet does not perform HARQ feedback with respect to the data packet.

In a word, whether the HARQ function is activated or deactivated for the data packet scheduled by the scheduling information is indicated dynamically through the scheduling information. As a result, it is able for each data packet to dynamically select whether to adopt the HARQ mechanism, thereby to improve the transmission flexibility of the data packet.

It should be appreciated that, the device in the embodiments of the present disclosure is a device capable of executing the above-mentioned method for processing the HARQ mechanism, so all the embodiments involving the method are applicable to the device with a same or similar beneficial effect.

The present disclosure further provides in some embodiments a computer-readable storage medium storing therein a computer program. The computer program is executed by a processor so as to implement the above-mentioned method for processing the HARQ mechanism with a same technical effect, which will not be particularly further defined herein. The computer-readable storage medium may be a Read-Only Memory (ROM), a Random Access Memory (RAM), a magnetic disk or an optical disk.

As shown in FIG. 3, the present disclosure further provides in some embodiments a network side device, which includes a transceiver 320, a memory 310, a processor 300, and a computer program stored in the memory 310 and executed by the processor 300, the transceiver 320 is configured to:

transmit scheduling information, wherein the scheduling information is used to schedule the transmission of a data packet and indicate whether the scheduled data packet adopts an HARQ mechanism.

In a possible embodiment of the present disclosure, the scheduling information includes a first bit field for indicating that an HARQ is to be activated or deactivated;

in the case that the first bit field indicates that the HARQ is to be activated, the data packet scheduled by the scheduling information adopts the HARQ mechanism;

in the case that the first bit field indicates that the HARQ is to be deactivated, the data packet scheduled by the scheduling information does not adopt the HARQ mechanism.

In a possible embodiment of the present disclosure, the scheduling information includes a second bit field for indicating an HARQ process number;

in the case that a value of the second bit field is a preset target value indicating that the HARQ is to be deactivated, the data packet scheduled by the scheduling information does not adopt the HARQ mechanism;

in the case that the value of the second bit field is not the target value, the data packet scheduled by the scheduling information adopts the HARQ mechanism.

In a possible embodiment of the present disclosure, the processor 300 is configured to semi-statically configure any of the following information:

an HARQ process number in an HARQ process set for activating the HARQ and an HARQ process number in a second HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set, in the case that the HARQ process indicated by the scheduling information belongs to the HARQ process set for activating the HARQ, the data packet scheduled by the scheduling information adopts the HARQ mechanism, and in the case that the HARQ process indicated by the scheduling information belongs to the HARQ process set for deactivating the HARQ, the data packet scheduled by the scheduling information does not adopt the HARQ mechanism.

In a possible embodiment of the present disclosure, whether the data packet scheduled by the scheduling information adopts the HARQ mechanism is indicated through a scrambling value scrambling the scheduling information; or whether the data packet scheduled by the scheduling information adopts the HARQ mechanism is indicated through a search space where the scheduling information is located; or whether the data packet scheduled by the scheduling information adopts the HARQ mechanism is indicated through a format of the scheduling information; or whether the data packet scheduled by the scheduling information adopts the HARQ mechanism is indicated through a length of the scheduling information.

In a possible embodiment of the present disclosure, the processor 300 is further configured to, in the case that the data packet scheduled by the scheduling information does not adopt the HARQ mechanism, configure an information field associated with the HARQ in the scheduling information for other uses.

In a possible embodiment of the present disclosure, in the case that the data packet scheduled by the scheduling information does not adopt the HARQ mechanism, a receiver receiving the data packet does not perform HARQ feedback with respect to the data packet.

In a word, whether the HARQ function is activated or deactivated for the data packet scheduled by the scheduling information is indicated dynamically through the scheduling information. As a result, it is able for each data packet to dynamically select whether to adopt the HARQ mechanism, thereby to improve the transmission flexibility of the data packet.

It should be appreciated that, the network side device in the embodiments of the present disclosure is a network side device capable of executing the above-mentioned method for indicating the HARQ mechanism, so all the embodiments involving the method are applicable to the network side device with a same or similar beneficial effect.

Figure 5:
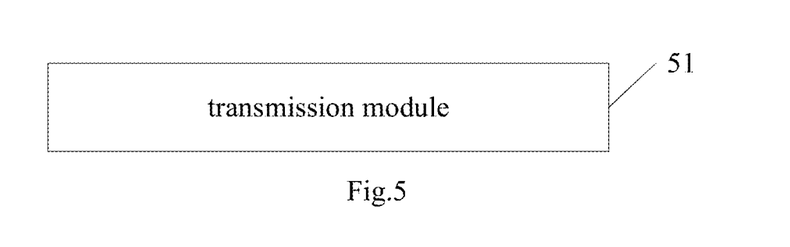
FIG. 5 is a schematic view showing a device for indicating an HARQ mechanism according to an embodiment of the present disclosure.

As shown in FIG. 5, the present disclosure further provides in some embodiments a device for indicating an HARQ mechanism for a network side device, which includes:

a transmission module 51 configured to transmit scheduling information, wherein the scheduling information is used to schedule the transmission of a data packet and indicate whether the scheduled data packet adopts the HARQ mechanism.

In a possible embodiment of the present disclosure, the scheduling information includes a first bit field for indicating that an HARQ is to be activated or deactivated;

in the case that the first bit field indicates that the HARQ is to be activated, the data packet scheduled by the scheduling information adopts the HARQ mechanism;

in the case that the first bit field indicates that the HARQ is to be deactivated, the data packet scheduled by the scheduling information does not adopt the HARQ mechanism.

In a possible embodiment of the present disclosure, the scheduling information includes a second bit field for indicating an HARQ process number;

in the case that a value of the second bit field is a preset target value indicating that the HARQ is to be deactivated, the data packet scheduled by the scheduling information does not adopt the HARQ mechanism; and in the case that the value of the second bit field is not the target value, the data packet scheduled by the scheduling information adopts the HARQ mechanism.

In a possible embodiment of the present disclosure, the device further includes:

a configuration module configured to semi-statically configure any of the following information:

an HARQ process number in an HARQ process set for activating the HARQ and an HARQ process number in a second HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set, in the case that the HARQ process indicated by the scheduling information belongs to the HARQ process set for activating the HARQ, the data packet scheduled by the scheduling information adopts the HARQ mechanism; and in the case that the HARQ process indicated by the scheduling information belongs to the HARQ process set for deactivating the HARQ, the data packet scheduled by the scheduling information does not adopt the HARQ mechanism.

In a possible embodiment of the present disclosure, whether the data packet scheduled by the scheduling information adopts the HARQ mechanism is indicated through a scrambling value scrambling the scheduling information; or whether the data packet scheduled by the scheduling information adopts the HARQ mechanism is indicated through a search space where the scheduling information is located; or whether the data packet scheduled by the scheduling information adopts the HARQ mechanism is indicated through a format of the scheduling information; or whether the data packet scheduled by the scheduling information adopts the HARQ mechanism is indicated through a length of the scheduling information.

In a possible embodiment of the present disclosure, the device further includes:

an information configuration module configured to, in the case that the data packet scheduled by the scheduling information does not adopt the HARQ mechanism, configure an information field associated with the HARQ in the scheduling information for other uses.

In a possible embodiment of the present disclosure, in the case that the data packet scheduled by the scheduling information does not adopt the HARQ mechanism, a receiver receiving the data packet does not perform HARQ feedback with respect to the data packet.

In a word, whether the HARQ function is activated or deactivated for the data packet scheduled by the scheduling information is indicated dynamically through the scheduling information. As a result, it is able for each data packet to dynamically select whether to adopt the HARQ mechanism, thereby to improve the transmission flexibility of the data packet.

It should be appreciated that, the device in the embodiments of the present disclosure is a device capable of executing the above-mentioned method for indicating the HARQ mechanism, so all the embodiments involving the method are applicable to the device with a same or similar beneficial effect.

The present disclosure further provides in some embodiments a computer-readable storage medium storing therein a computer program. The computer program is executed by a processor so as to implement the above-mentioned method for indicating the HARQ mechanism with a same technical effect, which will not be particularly further defined herein. The computer-readable storage medium is an ROM, an RAM, a magnetic disk or an optical disk.

It should be appreciated that, in the context, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The description has been given hereinabove in conjunction with the drawings and the embodiments, but the present disclosure shall not be limited to the above preferred embodiments. These embodiments are for illustrative purposes only, but shall not be used to limit the scope of the present disclosure. A person skilled in the art may make various alternations or modifications without departing from the spirit of the present disclosure and the scope defined in the appended claims, which also fall within the scope of the present disclosure.

The above are optional embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A method for processing a Hybrid Automatic Repeat reQuest (HARQ) mechanism for a terminal, comprising:
   receiving scheduling information, wherein the scheduling information is used to schedule transmission of a data packet; and
   determining whether the data packet scheduled by the scheduling information adopts the HARQ mechanism in accordance with the scheduling information,
   wherein the scheduling information comprises a second bit field for indicating an HARQ process number,
   wherein the determining whether the data packet scheduled by the scheduling information adopts the HARQ mechanism in accordance with the scheduling information comprises:
   in the case that a value of the second bit field is a preset target value indicating that the HARQ is to be deactivated, determining that the data packet scheduled by the scheduling information does not adopt the HARQ mechanism;
   in the case that the value of the second bit field is not the target value, determining that the data packet scheduled by the scheduling information adopts the HARQ mechanism,
   wherein the method further comprises:
   obtaining a scrambling value for scrambling the scheduling information,
   wherein in the case that the scrambling value is a preset value, when the value of the second bit field is the target value, the data packet scheduled by the scheduling information does not adopt the HARQ mechanism, and when the value of the second bit field is not the target value, the data packet scheduled by the scheduling information adopts the HARQ mechanism.

2. The method according to claim 1, wherein the scheduling information comprises a first bit field for indicating that an HARQ is to be activated or deactivated,
   wherein the determining whether the data packet scheduled by the scheduling information adopts the HARQ mechanism in accordance with the scheduling information comprises:
   in the case that the first bit field indicates that the HARQ is to be activated, determining that the data packet scheduled by the scheduling information adopts the HARQ mechanism; and
   in the case that the first bit field indicates that the HARQ is to be deactivated, determining that the data packet scheduled by the scheduling information does not adopt the HARQ mechanism.

3. The method according to claim 1, wherein the determining whether the data packet scheduled by the scheduling information adopts the HARQ mechanism in accordance with the scheduling information comprises:
   obtaining an HARQ process indicated by the scheduling information;
   in the case that the HARQ process indicated by the scheduling information belongs to an HARQ process set for activating the HARQ, determining that the data packet scheduled by the scheduling information adopts the HARQ mechanism;
   in the case that the HARQ process indicated by the scheduling information belongs to an HARQ process set for deactivating the HARQ, determining that the data packet scheduled by the scheduling information does not adopt the HARQ mechanism.

4. The method according to claim 3, further comprising:
   obtaining any of the following information configured semi-statically:
   an HARQ process number in the HARQ process set for activating the HARQ, and an HARQ process number in the HARQ process set for deactivating the HARQ;
   an HARQ process number in the HARQ process set for activating the HARQ;
   an HARQ process number in the HARQ process set for deactivating the HARQ;
   the quantity of HARQ processes in the HARQ process set for activating the HARQ;
   the quantity of HARQ processes in the HARQ process set for deactivating the HARQ;
   a maximum quantity of transmission times for the HARQ process in each HARQ process set.

5. The method according to claim 1, wherein the determining whether the data packet scheduled by the scheduling information adopts the HARQ mechanism in accordance with the scheduling information comprises:
   determining whether the data packet scheduled by the scheduling information adopts the HARQ mechanism in accordance with a scrambling value for scrambling the scheduling information; or
   determining whether the data packet scheduled by the scheduling information adopts the HARQ mechanism in accordance with a search space where the scheduling information is located; or
   determining whether the data packet scheduled by the scheduling information adopts the HARQ mechanism in accordance with a format of the scheduling information; or
   determining whether the data packet scheduled by the scheduling information adopts the HARQ mechanism in accordance with a length of the scheduling information.

6. The method according to claim 1, wherein
   in the case that the data packet scheduled by the scheduling information does not adopt the HARQ mechanism, a receiver receiving the data packet does not perform HARQ feedback with respect to the data packet.

7. A method for indicating a Hybrid Automatic Repeat reQuest (HARQ) mechanism for a network side device, comprising:
   transmitting scheduling information, wherein the scheduling information is used to schedule transmission of a data packet and indicate whether the scheduled data packet adopts the HARQ mechanism, wherein the method further comprises semi-statically configuring any of the following information:

an HARQ process number in an HARQ process set for activating the HARQ, and an HARQ process number in a second HARQ process set for deactivating the HARQ;

an HARQ process number in the HARQ process set for activating the HARQ;

an HARQ process number in the HARQ process set for deactivating the HARQ;

the quantity of HARQ processes in the HARQ process set for activating the HARQ;

the quantity of HARQ processes in the HARQ process set for deactivating the HARQ; and a maximum quantity of transmission times for the HARQ process in each HARQ process set, wherein in the case that the HARQ process indicated by the scheduling information belongs to the HARQ process set for activating the HARQ, the data packet scheduled by the scheduling information adopts the HARQ mechanism;

in the case that the HARQ process indicated by the scheduling information belongs to the HARQ process set for deactivating the HARQ, the data packet scheduled by the scheduling information does not adopt the HARQ mechanism.

8. The method according to claim 7, wherein the scheduling information comprises a first bit field for indicating that an HARQ is to be activated or deactivated;

in the case that the first bit field indicates that the HARQ is to be activated, the data packet scheduled by the scheduling information adopts the HARQ mechanism;

in the case that the first bit field indicates that the HARQ is to be deactivated, the data packet scheduled by the scheduling information does not adopt the HARQ mechanism.

9. The method according to claim 7, wherein the scheduling information comprises a second bit field for indicating an HARQ process number;

in the case that a value of the second bit field is a preset target value indicating that the HARQ is to be deactivated, the data packet scheduled by the scheduling information does not adopt the HARQ mechanism;

in the case that the value of the second bit field is not the target value, the data packet scheduled by the scheduling information adopts the HARQ mechanism.

10. The method according to claim 7, wherein whether the data packet scheduled by the scheduling information adopts the HARQ mechanism is indicated through a scrambling value scrambling the scheduling information; or whether the data packet scheduled by the scheduling information adopts the HARQ mechanism is indicated through a search space where the scheduling information is located; or whether the data packet scheduled by the scheduling information adopts the HARQ mechanism is indicated through a format of the scheduling information; or whether the data packet scheduled by the scheduling information adopts the HARQ mechanism is indicated through a length of the scheduling information.

11. The method according to claim 7, wherein in the case that the data packet scheduled by the scheduling information does not adopt the HARQ mechanism, the method further comprises:

configuring an information field associated with the HARQ in the scheduling information for other uses.

12. The method according to claim 7, wherein in the case that the data packet scheduled by the scheduling information does not adopt the HARQ mechanism, a receiver receiving the data packet does not perform HARQ feedback with respect to the data packet.

13. A network side device, comprising a transceiver, a memory, a processor, and a computer program stored in the memory and capable of being executed by the processor, wherein the transceiver is configured to implement the method according to claim 7.

14. A terminal, comprising a transceiver, a memory, a processor, and a computer program stored in the memory and capable of being executed by the processor;

the transceiver is configured to receive scheduling information, the scheduling information is used to schedule the transmission of a data packet;

the processor is configured to read the computer program in the memory to: determine whether the data packet scheduled by the scheduling information adopts a Hybrid Automatic Repeat reQuest (HARQ) mechanism in accordance with the scheduling information, wherein the scheduling information comprises a second bit field for indicating an HARQ process number;

the processor is further configured to:

in the case that a value of the second bit field is a preset target value indicating that the HARQ is to be deactivated, determine that the data packet scheduled by the scheduling information does not adopt the HARQ mechanism;

in the case that the value of the second bit field is not the target value, determine that the data packet scheduled by the scheduling information adopts the HARQ mechanism, wherein the processor is further configured to:

obtain a scrambling value for scrambling the scheduling information, wherein in the case that the scrambling value is a preset value, when the value of the second bit field is the target value, the data packet scheduled by the scheduling information does not adopt the HARQ mechanism, and when the value of the second bit field is not the target value, the data packet scheduled by the scheduling information adopts the HARQ mechanism.

15. The terminal according to claim 14, wherein the scheduling information comprises a first bit field for indicating that an HARQ is to be activated or deactivated;

the processor is further configured to:

in the case that the first bit field indicates that the HARQ is to be activated, determine that the data packet scheduled by the scheduling information adopts the HARQ mechanism;

in the case that the first bit field indicates that the HARQ is to be deactivated, determine that the data packet scheduled by the scheduling information does not adopt the HARQ mechanism.

* * * * *